Dec. 24, 1946.   C. A. FELTMAN   2,413,178
FRUIT JUICE SQUEEZER
Filed Jan. 25, 1945
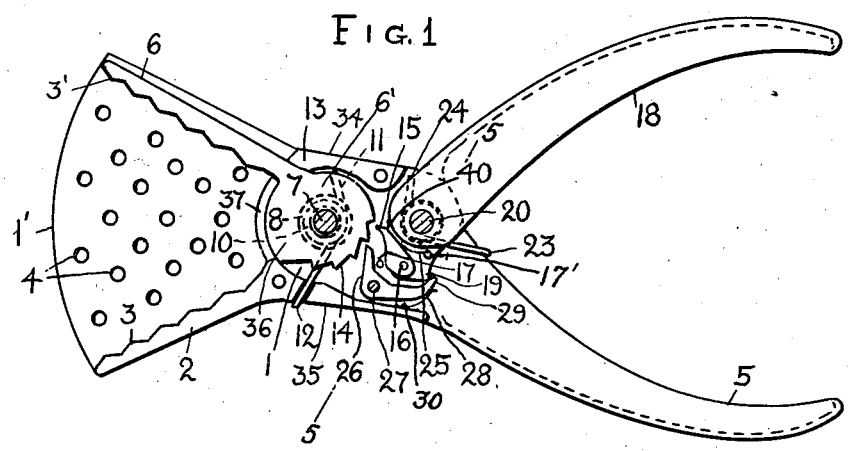
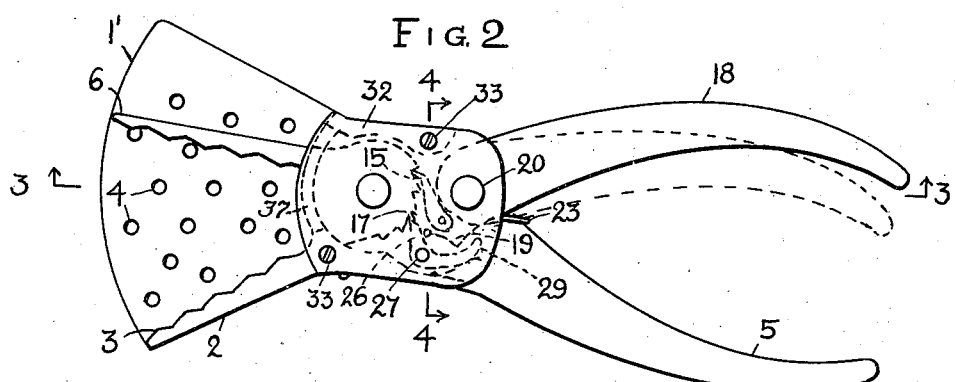
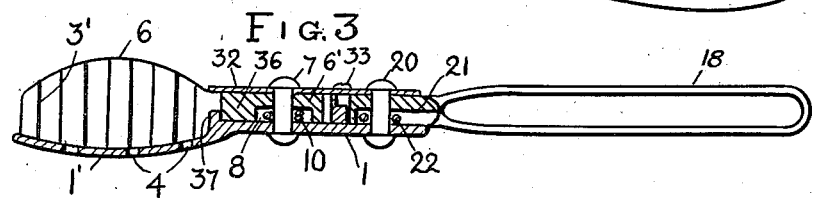
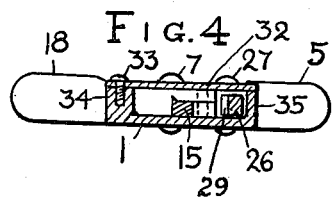
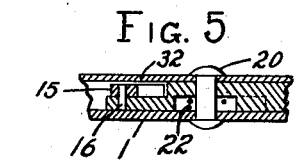
CHARLES A. FELTMAN
INVENTOR
BY John P. Nikonow
ATTORNEY Patented Dec. 24, 1946

2,413,178

UNITED STATES PATENT OFFICE 2,413,178

FRUIT JUICE SQUEEZER

Charles A. Feltman, Brooklyn, N. Y.

Application January 25, 1945, Serial No. 574,512

6 Claims. (Cl. 100—41)

My invention relates to fruit squeezers and has particular reference to portable or hand squeezers for citrus fruit such as limes, lemons, oranges, etc.

Ordinary hand squeezers as are used for squeezing juice from limes and similar fruit, usually cut in half for this purpose, require considerable force to squeeze most of the available juice from the fruit, and becomes very tiresome if this operation is to be repeated more or less often. To overcome this difficulty I provide my fruit squeezer with a force-amplifying means, whereby two or more strokes are required for squeezing a piece of lime or similar fruit, the force applied to the fruit being correspondingly multiplied. This result is accomplished in my squeezer by the use of a ratchet mechanism so that each squeezing movement of the handles of the squeezer produce a fraction of the total travel of the squeezing jaws. Upon completion of the squeezing operation, the ratchet mechanism is manually released and the device is made ready for the next fruit.

Other objects and advantages of my invention will be apparent from the accompanying specification and drawing in which—

Fig. 1 is a top plan view of my fruit squeezer with the cover removed and jaws in fully opened position;

Fig. 2 is a similar view with the cover in place and the movable jaw in a position after completion of the first complete movement of the movable handle;

Fig. 3 is a sectional view taken on the line 3—3 of Fig. 2;

Fig. 4 is a sectional view taken on the line 4—4 of Fig. 2;

Fig. 5 is a fractional sectional detail view of the movable handle taken on the line 5—5 of Fig. 1.

My fruit squeezer comprises a body 1 with a cup-shaped portion 1' adapted to receive a fruit to be squeezed, a jaw 2 being formed at one side of the cup-shaped portion 1' with teeth or corrugations 3. The cup-shaped portion may be preferably provided with a plurality of holes 4 for straining the juice squeezed from the fruit. A relatively stationary handle 5 extends integrally from the body 1.

A movable jaw 6 is provided with a hub portion 6' pivotally supported near one end of the body 1 on a pivot 7 and is also provided with teeth 3'. A cylindrical recess 8 is formed in the hub portion 6' for a spiral spring 10, one end 11 of the spring being held in a slot in the hub portion 6', and the other end 12 being held in a slot in the jaw 2. The spring is placed under tension so that it urges the jaw 6 outwards into engagement with a shoulder 13.

The hub 6' of the jaw 6 is of a circular shape and is provided with ratchet teeth 14, engaged by a pawl or dog 15, pivotally supported at 16 at the end of a movable handle 18. The latter is pivotally supported on a pivot 20, rigidly mounted on the base 1. A recess 21 is provided in the handle 18 around the pivot 20 for a spiral spring 22. One end 23 of the spring is bent against the handle 5, the other end 24 being fitted in the handle 18 in such a manner as to urge the movable handle outwards from the stationary handle 5. A spring 25 is secured at 17' to a lug 19 on the handle 18 and urges the pawl 15 towards the teeth 14.

A holding or locking pawl 26 is pivotally supported at 27 on the body 1 and is urged by a spring 28 towards the ratchet teeth 14. The spring 28 is secured at 30 to a flange or wall 35 on the jaw 2. A hook 29 on the holding pawl 26 is provided for releasing the movable jaw from the holding pawl thereby permitting the movable jaw to be returned to its original or inoperative position.

A cover plate 32 is fastened by screws 33 to raised side walls 34, 35 of the body 1, the pivots 7 and 20 passing through the cover.

To prevent the juice from the squeezed fruit from reaching into the ratchet mechanism, the movable jaw is provided with a semi-cylindrical portion 36, frictionally engaging an arcuate shoulder 37 on the body 1. The jaw 6 has a corresponding recess for engaging the shoulder 37. The pawl 15 is so positioned on the handle 18 that it is engaged by a pin 17 secured to the body 1 when the handle 18 is fully opened as shown in Fig. 1, thereby releasing the pawl 15 from the teeth 14. The lug 19 on the handle 18 at the same time engages the rear end 29 of the locking pawl 26, releasing the same from the teeth 14 as shown in Fig. 1 when the handle 18 is fully opened. Both pawls become released as soon as the handle 18 is moved towards the stationary handle 5 as shown in Fig. 2, the pawls then engaging the teeth 14.

For squeezing juice from a piece of fruit, the latter is placed on the perforated portion of the body 1, and the handles 5 and 18 are squeezed together as shown in Fig. 2. The pawl 15 will then turn the jaw 6 to a position shown in Fig. 2. The handle 18 is then partly released, permitting the pawl 15 to engage the next tooth. The jaw 6 will be prevented from moving backwards by the holding pawl 26, engaging the next tooth 14. With the next operating movement of the handle, the jaw 6 is further advanced towards the stationary jaw. The squeezing operation is completed in two or three strokes of the handle 18. The force at the jaws is thereby doubled or trebled (or increased even in a greater proportion) depending on the ratio of the length of the handle to the distance from the pivot 20 to the tooth 14 engaged by the pawl 15, in relation to the ratio of the length of the jaw to the radius of the tooth 14. As a result, relatively light pressure on the handle is required, greatly reducing the muscular effort needed for such an operation.

After the last stroke, when the squeezing operation is completed, the handle 18 is fully released and allowed to return to its original position, in which the pin 17 will disengage the pawl 15 from the teeth 14, and the lug 19 will disengage the locking or holding pawl 26 from the teeth 14. The movable jaw 6 will therefore snap back under pressure of the spring 10 into its inoperative or open position.

It is evident that my invention can be also applied to various other purposes by simply modifying the shape of the jaws 2 and 6, making them, for instance, as punches, shears, cutters, etc.

It will be understood that various features and principles of each of the embodiments of the invention above described or referred to may be utilized or substituted in the other embodiments.

While the invention has been described in detail with respect to certain particular preferred examples, it will be understood by those skilled in the art, after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A fruit squeezer comprising a body; a cup-shaped member on the body arranged to receive a fruit to be squeezed; a stationary jaw formed at one edge of the cup-shaped member; a fixed handle extending from the body; a movable jaw pivotally supported on the body; ratchet teeth on the movable jaw; a pawl arranged to engage the ratchet teeth; a movable handle pivotally supported on the body and operatively connected with the pawl for causing the movable jaw to move towards the stationary jaw in response to the movable handle being moved towards the fixed handle; a second pawl engaging the ratchet teeth and pivotally supported on the body; yieldable means to urge the second pawl towards the ratchet teeth for preventing the backward movement of the movable jaw; and an extension on the second pawl arranged to be engaged by the movable handle for releasing the second pawl from the teeth of the ratchet.

2. A fruit squeezer comprising a body; a cup-shaped member on the body arranged to receive a fruit to be squeezed; a stationary jaw formed at one edge of the cup-shaped member; a fixed handle extending from the body; a movable jaw pivotally supported on the body; ratchet teeth on the movable jaw; a pawl arranged to engage the ratchet teeth; a movable handle pivotally supported on the body and operatively connected with the pawl for causing the movable jaw to move towards the stationary jaw in response to the movable handle being moved towards the fixed handle; a second pawl engaging the ratchet teeth and pivotally supported on the body; yieldable means to urge the second pawl towards the ratchet teeth for preventing the backward movement of the movable jaw; means for releasing the second pawl from the ratchet teeth by the movable handle; yieldable means to urge the movable handle outwards from the stationary handle; and yieldable means to urge the movable jaw away from the stationary jaw.

3. A fruit squeezer comprising a body; a cup-shaped extension on the body for receiving a piece of a fruit; a stationary jaw at one side of the cup-shaped extension; a movable jaw cooperating with the stationary jaw and provided with a hub pivotally supported on the body; a handle extending from the body; a movable handle pivotally supported on the body; ratchet teeth on the hub; a pawl pivotally supported on the rear end of the movable handle engaging the teeth; a second pawl pivotally supported on the body engaging the teeth for preventing the movable jaw from moving outwards when the movable handle is moved outwards; a cover removably attached to the body for enclosing the ratchet teeth and the pawls; a shoulder on the cup-shaped extension concentric with the pivot of the movable jaw, the hub having a semi-cylindrical portion substantially diametrically opposite the teeth frictionally engaging the shoulder thereby sealing the space under the cover from the cup-shaped extension.

4. A squeezing appliance comprising a body; an extension on the body for receiving a work; a stationary jaw at one side of the extension; a movable jaw cooperating with the stationary jaw and provided with a hub pivotally supported on the body; a handle extending from the body; a movable handle pivotally supported on the body; ratchet teeth on the hub; a pawl pivotally supported on the rear end of the movable handle engaging the teeth; a second pawl pivotally supported on the body engaging the teeth; yieldable means to urge the second pawl into engagement with the teeth for preventing the return movement of the movable jaw; and means on the body to release the first pawl from the teeth of the ratchet wheel when the handle is placed in its extreme outward inoperative position.

5. A squeezing appliance comprising a body; a member on the body arranged to receive a work; a stationary jaw formed at one edge of the member; a fixed handle extending from the body; a movable jaw pivotally supported on the body; ratchet teeth on the movable jaw; a pawl arranged to engage the ratchet teeth; a movable handle pivotally supported on the body and operatively connected with the pawl for causing the movable jaw to move towards the stationary jaw in response to the movable handle being moved towards the fixed handle; a second pawl engaging the ratchet teeth and pivotally supported on the body; yieldable means to urge the second pawl towards the ratchet teeth for preventing the backward movement of the movable jaw; an extension on the second pawl arranged to be engaged by the movable handle for releasing the second pawl from the teeth of the ratchet; means operated by the movable handle at the end of its stroke to release the second pawl from the ratchet teeth; and means on the body to release the first pawl from the ratchet teeth when the movable handle is placed in its extreme outward position.

6. A fruit squeezer comprising a body; a cup-shaped member on the body arranged to receive a fruit to be squeezed; a jaw formed at one edge of the cup-shaped member; a handle extending from the body; a movable jaw pivotally supported on the body; ratchet teeth on the movable jaw; a pawl arranged to engage the ratchet teeth; a movable handle pivotally supported on the body and operatively connected with the pawl for causing the movable jaw to move towards the stationary jaw in response to the movable handle being moved towards the fixed handle; a second pawl engaging the ratchet teeth and pivotally supported on the body; yieldable means to urge the second pawl towards the ratchet teeth for preventing the backward movement of the movable jaw; an extension on the second pawl arranged to be engaged by the movable handle for releasing the second pawl from the teeth of the ratchet; and a projection on the body for releasing the first pawl from the teeth of the ratchet wheel when the movable handle is placed in the external outward position.

CHARLES A. FELTMAN.